United States Patent [19]
Knapp

[11] 3,827,016
[45] July 30, 1974

[54] THERMOSTATIC MIXER FOR HYDRAULIC SYSTEMS

[76] Inventor: Alfons Knapp, Bleicherstrasse 3, Biberach/Riss (BRD), Germany

[22] Filed: Feb. 6, 1973

[21] Appl. No.: 330,032

[30] Foreign Application Priority Data
Feb. 29, 1972  Italy.................................. 67629/72

[52] U.S. Cl. .......................... 236/12 R, 137/625.37
[51] Int. Cl. .......................................... G05d 23/13
[58] Field of Search............... 236/12 R; 137/625.37

[56] References Cited
UNITED STATES PATENTS

| | | | |
|---|---|---|---|
| 1,879,771 | 9/1932 | Snediker................................ | 236/12 |
| 2,932,454 | 4/1960 | Dillman ................................ | 236/12 |
| 2,989,081 | 6/1961 | Olsen............................ | 137/625.37 |
| 3,532,122 | 9/1970 | Bienzeisler:..................... | 137/625.37 |

FOREIGN PATENTS OR APPLICATIONS

| | | | |
|---|---|---|---|
| 669,993 | 9/1963 | Canada................................ | 236/12 |

*Primary Examiner*—William E. Wayner
*Attorney, Agent, or Firm*—Young & Thompson

[57] ABSTRACT

A thermostatic mixer for hydraulic systems, wherein the passages for the hot and cold water within the body of the mixer are mutually spaced in axial direction and, in the mounted mixer, they are separated the one another by a tubular ring provided with a sealing gasket seated between said passages, the tubular ring is kept in position by a detachable cover, and several radial passages serve for allowing the hot and cold water respectively to pass through the tubular ring, to a single inner cavity wherein a control valve is actuated by a thermometric bulb.

6 Claims, 1 Drawing Figure

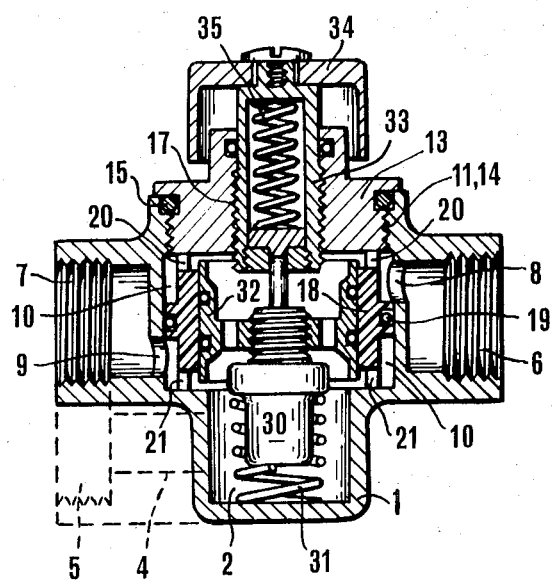

THERMOSTATIC MIXER FOR HYDRAULIC SYSTEMS

BACKGROUND OF THE INVENTION

This invention relates to a mixer for hot and cold water, of the type which includes a thermostat serving to control the mixing operation so as to ensure the delivery of water at a predetermined temperature.

Among the various problems arising with mixers of this kind there is the problem residing in the fact that it is necessary to provide within the stationary body of the mixer, which body has to be connected with the water pipings, a complicated system of passages which require an expensive casting operation. It would be preferable to effect the manufacture of the mixer by means of pressing followed by relatively inexpensive mechanical operations, or to have recourse to expensive constructions provided with an extractible cartridge.

BRIEF SUMMARY OF THE INVENTION

Accordingly, the main object of this invention is to provide a thermostatic mixer whose body has a structure of considerable simplicity which may be obtained by means of pressing (or by means of an economical casting process) and successive simple mechanical operations, while still maintaining the highest possible simplicity of the inner parts, a high efficiency and also a possibility of a particularly easy disassembly of the mixer.

This object is attained according to the invention by means of a thermostatic mixer of the type comprising a hollow body provided with inlet unions for hot and cold water and a delivery union for the mixed water and communication passages between said unions and the single cavity of the body, and comprising a control valve axially movable within said body and actuated by a thermometric bulb, with which it forms a thermostatic control device, characterized in that the passages for the hot and the cold water are spaced in axial direction from each other, that in the intermediate region between said passages for the hot and the cold water there is interposed between the body and the movable valve a tubular ring provided on its outside with a sealing gasket adapted to separate the passages for the hot and the cold water of the body, that a detachable cover is provided which is adapted to retain in position said tubular ring; and that between the tubular ring and the cover as well as between the tubular ring and the body there are provided a plurality of radial passages which serve for the hot and cold water respectively.

Preferably, said radial passages are formed by notches provided on the tubular ring, on the stationary body or on the cover.

Thus, the mentioned tubular ring: (a) provides a positive separation between the hot and cold water pipings, (b) defines, by means of its notches, fractionated passages which contribute to limit the noise, (c) forms, through the limitation of the single passages thus obtained, a protection filter for the inner parts of the mixer, and (d) acts as a spacer between the body and the cover, which may advantageously support the means for the adjustment of the thermostat. Such tubular ring can easily be made of an anticalcareous synthetic material by molding or pressure die-casting and its production cost is minimal. Its presence allows simplifying maximally the structure of the stationary body and its manufacture, particularly because of the separation thus obtained between the hot and cold water passages and because of the fact that the required annular distribution chambers communicating with the water passages are defined by the tubular ring itself between its notches and the body as well as between the notches and the valve. By virtue of this structural simplification the stationary body can be made economically by pressing, including the passages for the hot and the cold water which may be defined by dead holes formed during the pressing and successively opened when turning the inner cavity of the body.

BRIEF DESCRIPTION OF THE DRAWING

These and other features of the mixer according to the invention will be better understood from the following detailed description with reference to an illustrative and non-limitative embodiment represented in the accompanying drawing which shows an axial section of the mixer.

DETAILED DESCRIPTION OF THE PREFERRED EMBODIMENT

The body 1 of the mixer, which has to be fixedly connected to the water pipings and eventually incorporated in a wall, presents a single inner cavity whose deeper part 2 serves to contain the thermometric bulb; said cavity communicates with an outlet union 5. The outlet union 5, which is situated in a plane different from that of the section, is, for the purpose of clarity, indicated by dashed lines as if it was situated in the plane of the section. Furthermore, the body 1 is provided with two inlet unions 6 and 7 for the hot and the cold water, which unions are generally coaxial in order to facilitate installation, said unions being in communication, through openings 8 and 9 which are staggered in axial direction with respect to each other, with the part 10 of the cavity of body 1, which cavity part has a larger diameter than the deeper part 2 of the cavity. A screwed thread 11 is provided adjacent the mouth of the cavity. As can be seen, the structure of the body 1 is very simple and is well adapted to be manufactured by pressing and successive mechanical operations. Opening of ports 4, 8 and 9 for the purpose of establishing communication with the delivery unions and the inlet unions is accomplished by the operation of turning of the inner cavity part 10 and of the cavity part 2.

When the mixer is mounted, the body 1 is closed by a detachable cover 13 which is provided with a screw thread 14 to be screwed into the screw thread 11 of body 1, a gasket 15 which provides a seal in respect of the body 1, and an internally threaded portion 17 which serves to receive the means for the adjustment of the thermostat.

When assembling the mixer, a tubular ring 18 is inserted into the cavity 10 of body 1 which has a relatively larger diameter; said tubular ring is provided on its outer part with a gasket 19 destined to be positioned in the body 1 in an intermediate position, in axial direction, between the ports 8 and 9 which it thus separates positively by dividing the cavity 10, around the ring 18, in to two annular chambers which communicate respectively with the inlet unions for the hot and the cold water. The ends of the ring 18 are ragged by notches 20 and 21 defining a plurality of narrow radial passages which serve respectively for the hot and the cold water and act as flow dividers as well as a filter for retaining the coarser impurities which could damage the mixer.

The annular ring 18, compressed between the body 1 and the detachable cover 13, acts as a spacer between these two parts.

In the interior of the body 1 and of the annular ring 18 there is provided a thermostatic device comprising a thermometric expansion bulb 30, pushed by a spring 31 and fixedly connected to a dis-tribution valve 32 whose axial displacement modifies the ratio between the free passage sections offered to the water which penetrates through the passages 20 and 21 respectively, thereby modifying the mixing proportions in such a manner as to maintain at a predetermined value the temperature of the mixed water which is then delivered through the union 5 after having lapped the thermometric bulb 30. The adjustment of the temperature of the delivered water is achieved by means of a screw 33 screwed into the cover 13, which acts on the end of the bulb 30 opposed to the spring 31 and terminates at the outside with an operation knob 34, the rotation of said knob producing the modification of the adjustment of the thermostat. The screw 33 contains in its interior the well known safety spring 35 which serves to prevent overcharges of the bulb 30.

Obviously, various modifications of the execution particulars and the arrangements of the mixer may be made without departing from the scope of the invention and of the present patent. Particularly, one or both notches 20 and 21, which have been represented as situated at the ends of the ring 18, could instead be provided respectively on the body 1 and/or on the cover 13. In certain cases they could also be replaced by perforations formed in the ring 18. Furthermore, where nonreturn valves are required, these valves may be incorporated in the body 1 in a well known manner (not represented). Also the arrangement of the unions 5–7 of the body 1 may vary, whose position may be chosen freely and which may be distributed in any suitable manner around the body and directed radially, tangentially, axially or inclined in any other desired manner, in view of the best possibility of installation.

Having thus described my invention, what I claim is:

1. A thermostatic mixer for hydraulic systems comprising: a hollow body having inlet unions for hot and cold water, a delivery union for mixed water, a single inner cavity, communication passages between each of said inlet and delivery unions and said single inner cavity, each of said passages being spaced from each other in the axial direction of said single cavity; a tubular ring inserted in said single cavity and having an outer sealing gasket seated against said single cavity in a region thereof intermediate between said passages communicating with said inlet unions for hot and cold water; a detachable cover connected to said body and contacting said tubular ring; a first plurality of radial passages between said body and said tubular ring; a second plurality of radial passages between said cover and said tubular ring; a control valve axially movable within said tubular ring, said control valve throttling said first and second pluralities of radial passages according to its own axial position; and a thermometric bulb housed in said single cavity to position said control valve axially according to the temperature of water contacting said bulb.

2. A thermostatic mixer as set forth in claim 1, wherein said first and second pluralities of radial passages are formed by notches provided on the ends of said tubular ring.

3. A thermostatic mixer as set forth in claim 1, wherein said tubular ring is made of a synthetic plastic material.

4. A thermostatic mixer as set forth in claim 1, wherein said thermostatic control device comprises said control valve, said thermometric bulb connected to said control valve, a spring operatively inserted between said thermometric bulb and said body, and an adjustment screw, screwed into said cover, having an outer operation knob and acting on an end of said thermometric bulb opposite said spring.

5. A thermostatic mixer as set forth in claim 4, wherein said adjustment screw has an inner cavity, and a safety spring is housed within said inner cavity of the adjustment screw and is operatively inserted between said adjustment screw and said end of the thermometric bulb.

6. A thermostatic mixer as set forth in claim 1, wherein said radial passages of the first and second plurality expand towards the inside into recesses forming distribution chambers.

* * * * *